United States Patent
Döring et al.

(10) Patent No.: US 10,648,423 B2
(45) Date of Patent: May 12, 2020

(54) METHOD AND CONTROL SYSTEM FOR OPERATING AN INTERNAL COMBUSTION ENGINE

(71) Applicant: MAN DIESEL & TURBO SE, Augsburg (DE)

(72) Inventors: Andreas Döring, München (DE); Armin Weber, Kammlach (DE)

(73) Assignee: MAN Energy Solutions SE, Augsburg (DE)

(*) Notice: Subject to any disclaimer, the term of this patent is extended or adjusted under 35 U.S.C. 154(b) by 1 day.

(21) Appl. No.: 16/033,028

(22) Filed: Jul. 11, 2018

(65) Prior Publication Data
US 2019/0017460 A1 Jan. 17, 2019

(30) Foreign Application Priority Data
Jul. 13, 2017 (DE) .................. 10 2017 115 757

(51) Int. Cl.
| | |
|---|---|
| *F02D 41/30* | (2006.01) |
| *F02D 35/02* | (2006.01) |
| *F02D 41/00* | (2006.01) |
| *F02D 41/20* | (2006.01) |
| *F02D 41/24* | (2006.01) |
| *F02D 41/22* | (2006.01) |
| *F02D 19/06* | (2006.01) |
| *F02D 41/14* | (2006.01) |

(Continued)

(52) U.S. Cl.
CPC ..... *F02D 41/3047* (2013.01); *F02D 19/0623* (2013.01); *F02D 35/027* (2013.01); *F02D 41/0027* (2013.01); *F02D 41/1497* (2013.01); *F02D 41/20* (2013.01); *F02D 41/221* (2013.01); *F02D 41/2438* (2013.01); *F02D 41/2441* (2013.01); *F02D 41/2467* (2013.01); *F02D 41/345* (2013.01); *F01L 1/267* (2013.01); *F02D 2200/025* (2013.01); *F02D 2200/0612* (2013.01)

(58) Field of Classification Search
CPC ............ F02D 41/3047; F02D 41/2467; F02D 41/345; F02D 41/1497; F02D 41/221; F02D 19/0623; F02D 19/0626; F02D 19/0663; F02D 19/08; F02D 2041/224; F02D 2041/226
See application file for complete search history.

(56) References Cited

U.S. PATENT DOCUMENTS

| | | | | |
|---|---|---|---|---|
| 5,945,596 | A * | 8/1999 | Burkel | ................ F02D 41/1497 73/114.38 |
| 6,390,068 | B1 * | 5/2002 | Hartke | ................ F02D 41/1497 123/435 |
| 9,784,635 | B2 * | 10/2017 | Bizub | ................ F02D 41/1497 |

(Continued)

*Primary Examiner* — George C Jin
(74) *Attorney, Agent, or Firm* — Cozen O'Connor

(57) ABSTRACT

A method for operating an internal combustion engine with multiple cylinders. Each cylinder of the internal combustion engine includes at least one fuel injector, and each fuel injector is activated for opening and closing via a solenoid valve of the respective fuel injector. Structure-borne sound waves emitted by the fuel injectors and/or accelerations caused by the fuel injectors are detected by measurement. The structure-borne sound waves detected by measurement and/or the accelerations detected by measurement are evaluated, and based on the evaluation, characteristics of the fuel injectors are automatically determined.

14 Claims, 3 Drawing Sheets

(51) Int. Cl.
*F02D 41/34* (2006.01)
*F01L 1/26* (2006.01)

(56) References Cited

U.S. PATENT DOCUMENTS

2018/0156153 A1* 6/2018 Denk ...................... F02D 41/20
2019/0152495 A1* 5/2019 Altonji .................... B61C 5/00

* cited by examiner

METHOD AND CONTROL SYSTEM FOR OPERATING AN INTERNAL COMBUSTION ENGINE

BACKGROUND OF THE INVENTION

1. Field of the Invention

The invention relates to a method for operating an internal combustion engine and to a control system for carrying out the method.

2. Description of the Related Art

An internal combustion engine comprises multiple cylinders. In the region of each cylinder, at least one fuel injector is installed. The fuel injectors are activatable for opening and closing, namely via solenoid valves of the fuel injectors, which are supplied with a suitable activation current. The fuel injectors can be fuel injectors for diesel fuels such as heavy fuel oil or residual oil or fuel injectors for gas fuels. Fuel injectors are also described as fuel injection valves.

Typically, a dual-fuel engine comprises three fuel injectors for each cylinder, namely a main fuel injector for diesel fuels, via which in a first operating mode, which is also described as diesel operating mode, ignitable diesel fuel is introduced into the cylinders, and a gas fuel injector and an ignition fluid fuel injector, wherein in a second operating mode, which is also described as gas operating mode, an inherently unignitable mixture of charge air and gas fuel is typically provided via the gas fuel injector, which can be ignited via ignition fluid, which in the second operating mode is introduced into the respective cylinders via the ignition fluid fuel injector. Here, diesel fuel serves as ignition fluid. Since in the second operating mode relatively small quantities of diesel fuel have to be introduced into the respective cylinder and main fuel injectors are not to date designed for providing such small fuel quantities, it is necessary according to the prior art to install separate ignition fluid fuel injectors with reduced injection quantities in a dual-fuel engine.

During the operation of the internal combustion engine, the fuel injectors are subject to wear. For this reason, internal combustion engines, namely the fuel injectors of the same, have to be maintained or even replaced at defined service intervals. In particular in the case of large internal combustion engines, such as for example diesel internal combustion engines on ships, which as diesel fuel are operated with heavy fuel oil, residual oil or the like, the estimation of such service intervals proves to be difficult because of the multiplicity and variant variety of the fuel qualities and thus of the wear rates caused by these. Furthermore, such fuel injectors are subject to increased wear, in particular through high sulphur and ash proportions in the diesel fuel, which lead to increased wear, or through increased metal contents in the diesel fuel, which can result in the formation of slag and prevent a closing of the fuel injectors. Similar problems also occur with the gas fuel injectors, in particular during the operation with biogas.

From practice it is known to check the behaviour of the fuel injectors based on an exhaust gas temperature detected by measurement. However this is inaccurate and involves long delay times since a fault or a wear on fuel injectors dependent on the exhaust gas temperature can be determined only with major delay.

SUMMARY OF THE INVENTION

There is a need for a method for operating an internal combustion engine, with the help of which characteristics of the fuel injectors can be easily, reliably, and quickly monitored in order to detect and trigger service operations or maintenance operations that are required in particular dependent thereon. In particular there is also a need for operating the main fuel injectors more accurately in dual-fuel engines so that separate ignition fluid fuel injectors can be omitted. Starting out from this, one aspect of the present invention is based on creating a new type of method for operating an internal combustion engine and a control system for carrying out the method.

According to the invention, structure-borne sound waves emitted by the fuel injectors and/or accelerations caused by the fuel injectors are detected by measurement, wherein the structure-borne sound waves and/or accelerations of the fuel injectors detected by measurement are evaluated, wherein based on the evaluation, characteristics of the fuel injectors are automatically determined. Preferentially, the structure-borne sound waves and/or accelerations detected by measurement are compared with a respective reference value and/or among themselves for the evaluation. In particular, a defect or a wear on fuel injectors can be quickly detected without delay.

Preferentially, based on the comparison, fuel injectors that operate properly and fuel injectors that do not operate properly are automatically detected. In particular when the structure-borne sound waves and/or accelerations detected on different or four different fuel injectors of other fuel injectors are mutually compared, properly operating fuel injectors and fuel injectors which do not operate properly can be particularly advantageously determined.

Preferentially, based on the comparison, an opening duration, and/or opening speed, and/or closing speed, and/or an opening time, and/or a closing time and/or an opening degree, and/or closing degree, and/or a wear, and/or a drift of the fuel injectors are automatically determined. All these operating parameters of the fuel injectors can be detected through the detection and evaluation of structure-borne sound waves emitted by the fuel injectors and/or accelerations caused by the fuel injectors. All these characteristic quantities constitute characteristics of the fuel injectors based on which service operations and maintenance operations can be triggered in an automated manner.

Preferentially, the structure-borne sound waves and/or accelerations are detected with the help of structure-borne sound wave sensors and/or with the help of acceleration sensors which are preferentially attached directly to the fuel injectors. By directly attaching the respective sensors to the fuel injectors, the structure-borne sound waves and/or accelerations can be particularly accurately determined.

According to an advantageous further development of the invention, the solenoid valves of the fuel injectors are then activated for opening and closing without fuel injection pressure on the fuel injectors during the stationary state of the internal combustion engine, in the so-called standby mode, and structure-borne sound waves emitted by the fuel injectors and/or accelerations caused by the fuel injectors are detected by measurement and dependent on a comparison of the actual measurement quantities with set point quantities, a solenoid valve-dependent drift or wear of the fuel injectors identified. This is advantageous since interference influences that occur during the operation of the internal combustion engine can thereby be avoided. During this standby mode it is provided to minimise the fuel pressure, lower the same to zero at best, in order to avoid injecting fuel during the activation of the injectors/injection valves. Preferentially, a start of activation and/or an end of activation of the respective solenoid valve of the respective fuel injector is adapted dependent on the solenoid valve-dependent drift or wear. According to a further advantageous further development of the invention, structure-borne sound waves emitted by the fuel injectors and/or accelerations caused by the fuel injectors are detected by measurement in particular when the internal combustion engine is operated in the injection mode and in the process the solenoid valves of the fuel injectors are activated for opening and closing with fuel injection pressure on the fuel injectors, and dependent on a comparison of the actual measurement quantities with set point quantities a nozzle needle-dependent and/or nozzle seat-dependent drift or wear of the fuel injectors identified. Preferentially, the activation start and/or the activation end of the respective solenoid valve of the respective fuel injector is adapted dependent on the nozzle needle-dependent and/or nozzle seat-dependent drift or wear. With these further developments, fuel injectors can be operated more accurately. In the case of dual-fuel engines, the main fuel injectors can be utilised as ignition fluid fuel injectors so that separate ignition fluid fuel injectors can be omitted.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

Figure 1:
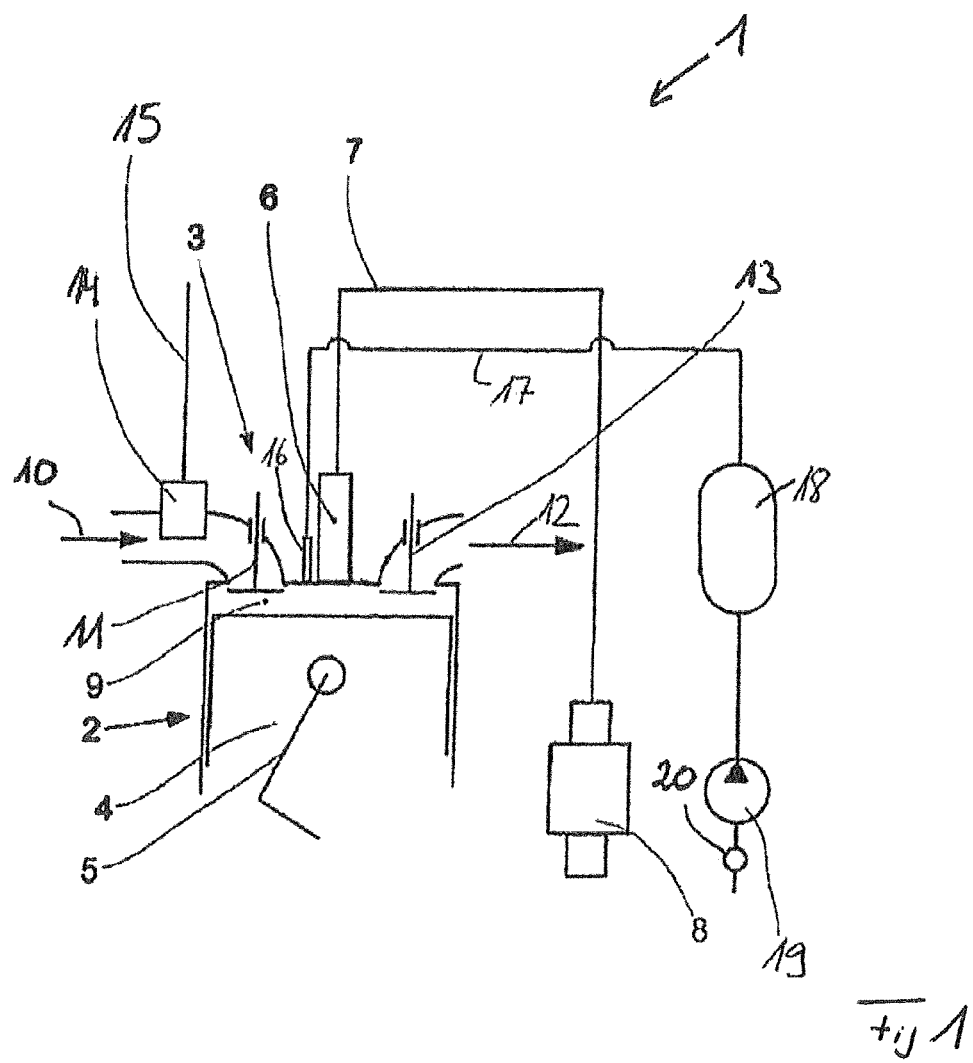
FIG. 1 is a schematic block diagram of a dual-fuel engine.

The invention relates to a method for operating an internal combustion engine and to a control system for carrying out the method. In terms of the present invention it is proposed that structure-borne sound waves emitted by fuel injectors and/or accelerations caused by the fuel injectors are detected by measurement and evaluated. The structure-borne sound waves and/or accelerations detected by measurement are preferentially compared with a reference value and/or among themselves for evaluation, wherein based on this comparison characteristics of the fuel injectors are automatically determined. Based on the automatically detected characteristics, a wear state of the fuel injectors can be determined for example, in order to in particular automatically trigger service operations or maintenance operations on the internal combustion engine on the control side dependent thereon. Dependent on the state of wear, an emergency stop can also be triggered.

When structure-borne sound waves emitted by the fuel injectors are detected, this is effected with the help of structure-borne sound wave sensors that are preferentially directly attached to the fuel injectors. The structure-borne sound wave sensors can also be attached to assemblies that are coupled to the fuel injectors. In particular when accelerations caused by the fuel injectors are detected, acceleration sensors are employed for this purpose that are preferentially directly attached to the fuel injectors. The acceleration sensors can also be attached to assemblies that are coupled to the fuel injectors.

As already explained, the structure-borne sound waves detected by measurement and emitted by the fuel injectors and/or the accelerations detected by measurement and caused by the fuel injectors are evaluated in order to automatically determine characteristics of the fuel injectors.

Here it is possible to compare the structure-borne sound waves and the accelerations with reference values pre-set on the control side.

Alternatively it is also possible to compare the structure-borne sound waves detected for a fuel injector by measurement and/or accelerations of the structure-borne sound waves and/or accelerations detected on other fuel injectors in order to thereby determine, by comparing the measurement values of different fuel injectors, determine different states on the respective fuel injectors without reference values predetermined fixed on the control side.

Based on the evaluation of the quantities detected by measurement, properly operating fuel injectors and fuel injectors that do not operate properly can be automatically determined.

In particular by detecting and evaluating emitted structure-borne sound waves and/or caused accelerations an opening duration and/or opening speed and/or closing speed and/or an opening time and/or a closing time and/or an opening degree and/or a closing degree and/or a wear and/or a drift on the respective fuel injectors can be determined. All these characteristics can be utilised in order to automatically trigger service and maintenance operations on the internal combustion engine on the control side.

For detecting the accelerations caused by the fuel injectors or the emitted structure-borne sound waves, sensors can be employed that exclusively record measurement values in a single measurement direction, or alternatively sensors that also record measurement signals in multiple measurement directions. Sensors which record corresponding measurement values in multiple directions are also described as multi-access pickups. In particular when sensors are employed that exclusively measure in a single direction, multiple such sensors combined with one another can be employed and arranged in different space directions. By way of the different run lengths and/or angles of incidence of the signals that occur in different space directions, further possibilities of the signal evaluation materialize.

Further details of the invention are described in the following for the preferred application range on dual-fuel engines making reference to the figures.

Assemblies of a dual-fuel engine 1 known from the prior art are shown in FIG. 1, wherein FIG. 1 shows a cylinder 2 or such a dual-fuel engine 1. The cylinder 2 comprises a cylinder head 3. In the cylinder 2, a piston 4, which is guided by a connecting rod 5, moves up and down.

In the cylinder head 3, a main fuel injector 6 is attached, by way of which the ignitable fuel, in particular diesel fuel can be injected into a combustion chamber 9 of the cylinder 2 via a fuel line 7 emanating from a fuel pump 8. The main fuel injector 6, the fuel line 7, and the fuel pump 8 are elements of a feed system, which in a first operating mode, in a so-called diesel operating mode, serves for feeding ignitable diesel fuel into the combustion chamber 9 of the cylinder 2. The diesel fuel can be for example heavy fuel oil or residual oil. This fuel feed system is active in particular when in the first operating mode diesel fuel is combusted in the cylinder 2. For combusting the diesel fuel, charge air 10 can be additionally introduced into the respective cylinder 2 of the dual-fuel engine 1 via inlet valves 11, wherein exhaust gas 12 generated during the combustion of the fuel can be discharged from the respective cylinder 2 of the dual-fuel engine 1 via exhaust valves 13.

In the combustion chamber 9 of the cylinder 2 of the dual-fuel engine 1, a gas fuel can be alternatively combusted in a second operating mode, in a so-called gas operating mode. For this purpose, the dual-fuel engine 1 comprises a gas fuel injector 14, via which gas fuel, which is provided via a gas supply line 15, is introduced into the combustion air 10, wherein the gas-air mixture is introduced into the combustion chamber 8 of the cylinder 2 via inlet valves 11. The gas injector can also be embodied such that gas fuel is directly added into the combustion chamber (not shown here). Such a case is described as a gas direct injection. The method according to the invention can also be employed for this type of gas addition. An ignitable ignition fluid, which can be introduced into the combustion chamber 9 of the cylinder 2 with the help of an ignition fluid injector 16, serves for igniting the gas-air mixture which is inherently unignitable as such in the second operating mode of the dual-fuel engine 1. Diesel fuel serves as ignition fluid in this case. The ignition fluid injector 16 is part of a separate ignition fluid injection system comprises an ignition fluid injector 16 for each cylinder 2 of the dual-fuel engine 1. The ignition fluid injector 16 can be additionally supplied with ignition fluid via an ignition fluid line 17 emanating from an ignition fluid storage unit 18, wherein the ignition fluid storage unit 18 is assigned an ignition fluid delivery pump 19 which supplies the ignition fluid storage unit 18 with ignition fluid. The ignition fluid delivery pump 19 can be assigned a suction throttle 20.

In the case of a dual-fuel engine known from the prior art, three fuel injectors are accordingly present for each cylinder 2, namely the main fuel injector 6 for the first operating mode and the gas-fuel injector 15 and the ignition fluid fuel injector 16 for the second operating mode. The reason that with dual-fuel engines known from practice the main fuel injectors 6, which introduce the diesel fuel into the cylinder 2 in the first operating mode, cannot also be utilised as ignition fluid fuel injectors in the second operating mode is that with dual-fuel engines known from practice the main fuel injectors 6 cannot be operated with sufficient accuracy with the minute fuel quantities necessary for this purpose.

Figure 2:
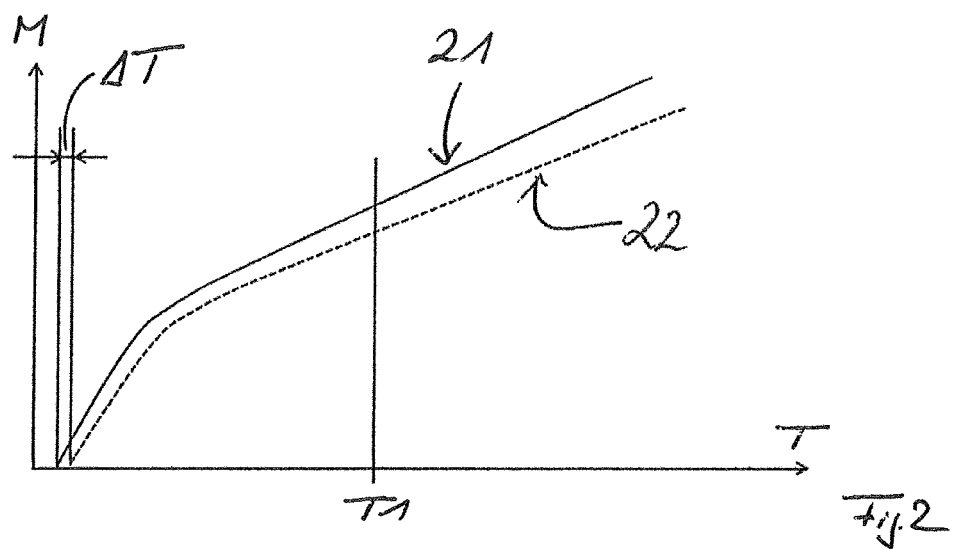
FIG. 2 is a time diagram for illustrating the prior art.

Accordingly, FIG. 2 shows a diagram in which an injection mass M is plotted over an activation time T of a main fuel injector 6. Here, a curve profile 21 shows a set point injection mass as a function of the activation time of a main fuel injector 6, the curve profile 22 shows an actual injection mass which forms as a consequence of a drift and/or wear on the main fuel injector 6 as a function of the activation time T. The activation time T of a fuel injector is to mean that period of time with which a solenoid valve of the fuel injector 6 is energized in order to open the respective fuel injector at the start of the energization and to close the respective fuel injector at the end of the energization.

FIG. 2 shows that the profile of the actual injection mass 20 significantly differs from the profile of the set point injection mass 21, namely in FIG. 2 exemplarily in such a manner that with very small activation times T the main fuel injector 6 despite activation initially introduces a fuel into the cylinder 2 and that with increasingly greater activation times T the main fuel injector 6 always introduces a smaller actual injection mass into the cylinder than is pre-set by the set point injection mass 21. The deviation $\Delta T$ in this case illustrates the drift or wear on the fuel injection valve that initially results, despite activation of the fuel valve, the same does not introduce any fuel into the cylinder.

As already mentioned, structure-borne sound waves emitted by fuel injectors and/or accelerations caused by fuel injectors are detected by measurement.

Figure 3:
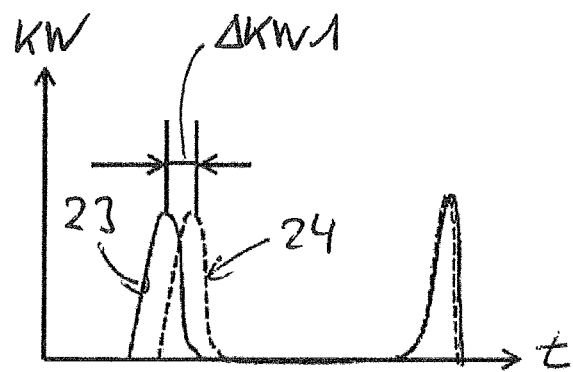
FIG. 3 is a first time diagram for illustrating the invention.
Figure 5:
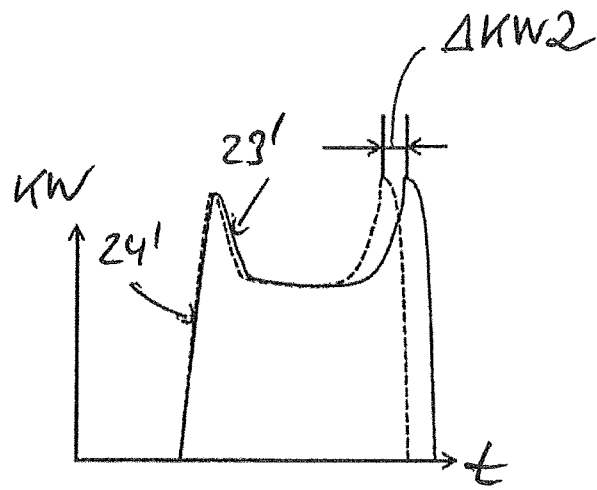
FIG. 5 is a third time diagram for illustrating the invention.

FIG. 3 visualizes structure-borne sound waves KW_over the time t namely a set point profile 23 and an actual profile 24 of structure-borne sound waves, (profile FIG. 3 and FIG. 5 is a processed structure-borne sound wave signal profile, wording instead of structure-borne sound waves, solid-borne signal profile with respect to FIG. 1), which are to be theoretically present and actually form when a main fuel injector 6 is activated with the activation time T1 exemplarily selected in FIG. 2 for opening and closing, namely in particular when the dual-fuel engine 1 is operated in the standby mode, in particular when the solenoid valve of the main fuel injector 6 is activated without fuel injection pressure on the same for opening and closing.

According to the invention, the actually emitted actual structure-borne sound waves 24 are compared with the set point structure-borne sound waves 23 (comparison performed in the form of for example characteristic fields (opening, closing etc.) for the characteristic quantified reference values or model-based . . . compared regarding their signal characteristic . . . ), wherein here according to FIG. 3 in the case of the stand by model of the dual-fuel engine 1 an offset of the respective main fuel injector 6 (change of the solid-borne sound over time realign $\Delta KW$ misleading if applicable) between maximum values of the set point structure-borne sound waves 23 and the actual structure-borne sound waves 24 during the opening of the respective main fuel injector 6 is determined. In the exemplary example of FIG. 3, no such deviation between the set point structure-borne sound waves 23 and the actual structure-borne sound waves 24 determined in the standby mode at the end of the activation, i.e. during the closing of the main fuel injector 6.

However it is pointed out that in the standby mode such a deviation between the actual structure-borne sound waves 24 and the actual structure-borne sound waves 23 can be determined even at the end of the activation, i.e. during the closing of the respective main fuel injector 6, or only at the end of the activation of the respective main fuel injector 6 (profile FIG. 3 and FIG. 5 is a processed structure-borne sound wave signal profile, wording instead structure-borne sound waves, solid-borne signal profile with reference to Fig), i.e. a corresponding deviation between the maximum values of the structure-borne sound waves 23, 24.

It is provided that in particular when in the stand by operating mode a deviation between the actually emitted actual structure-borne sound waves 24 and the set point structure-borne sound waves 23 is determined, a solenoid valve-dependent drift or wear of the main fuel injector 6 is determined, wherein in particular when dependent on this solenoid-dependent drift or wear an activation start and/or an activation end, in FIG. 3 an activation start, of the respective solenoid valve of the respective main fuel injector 6 is adapted.

Figure 4:
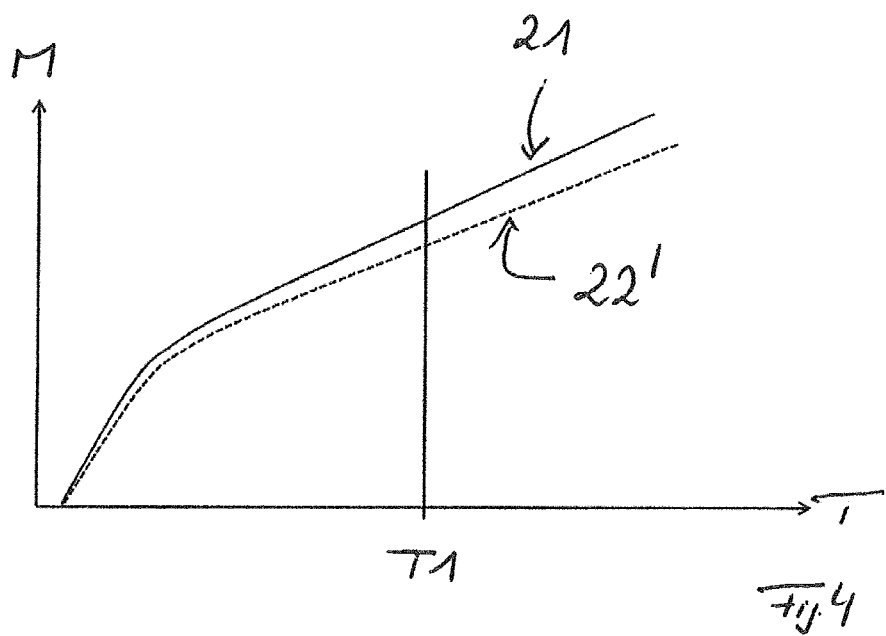
FIG. 4 is a second time diagram for illustrating the invention.

FIG. 4 shows over the activation time T again the injection mass M (I consider T as activation time and t as time access unit practical. Alternatively to T (SOE-EOE) start of energizing—start of energizing), namely the set point injection mass 21 and an actual injection mass 22', wherein the actual injection mass 22' forms in particular when the control of the solenoid valve of the main fuel injector 6 is adapted dependent on the solenoid valve-dependent drift or wear determined in FIG. 3, namely dependent on the offset ΔT1 of the structure-borne sound wave signal 23, 24 at the start of the activation of the solenoid valve of the respective main fuel injector 6. It is evident from FIG. 4 that by this adaptation of the activation of the solenoid valve in particular with small activation times T the actual injection mass 22' already follows more prominently the set point injection mass 21 than is the case according to FIG. 2 with activation times that have not been adapted.

A deviation between actual structure-borne sound waves and set point structure-borne sound waves is not only detected in particular when the internal combustion engine is operated in the standby mode without injection pressure on the main fuel injectors but also in particular when the internal combustion engine is operated in the injection mode and during the activation of the solenoid valves of the main fuel injectors 6 for opening and closing, fuel injection pressure is present on the same. In FIG. 5, structure-borne sound waves—(sound intensity) is again plotted over the time t, namely a profile of set point structure-borne sound waves 23' and of actual structure-borne sound waves 24' (profile FIG. 3 and FIG. 5 is a processed structure-borne sound wave signal profile, use solid-borne signal profile instead of structure-borne sound waves with reference to Fig—sound intensity), namely again for the activation duration T1 of the solenoid valve of the respective fuel injector 6, wherein in FIG. 5 the activation duration has already been adapted dependent on the solenoid valve-dependent drift or wear of the main fuel injector 6 determined in the standby mode.

In the example shown in FIG. 5, the profile of the actual structure-borne sound waves 23' is detected by measurement and compared with the profile 24 in particular when in the injection mode the solenoid valve of the respective main fuel injector 6 with fuel injection pressure on the main fuel injector 6 is activated for opening and closing, wherein in FIG. 5 exemplarily at the end of the injection duration, i.e. during the closing of the respective main fuel injector 6, a deviation ΔT2 between the set point profile 24' and the actual profile 23' of the structure-borne sound waves KW is detected. This offset ΔT2 is indicative of a nozzle needle-dependent and/or nozzle seed-dependent drift or wear on the respective fuel injector 6, wherein based on this nozzle needle-dependent and/or nozzle seat-dependent drift or wear the activation duration, and namely in FIG. 5 the activation end, of the solenoid valve of the respective main fuel injector 6 is again adapted to compensate for this nozzle needle-dependent and/or nozzle seat-dependent drift or wear which is reflected by the offset ΔT2 between the actual structure-borne sound waves 23 and the set point structure-borne sound waves 24. It is pointed out that in the injection mode such a deviation between the actual structure-borne sound waves 24 and the set point structure-borne sound waves 23 can be determined in the injection mode even at the start of the activation, i.e. during the opening of the respective main fuel injector 6.

Figure 6:
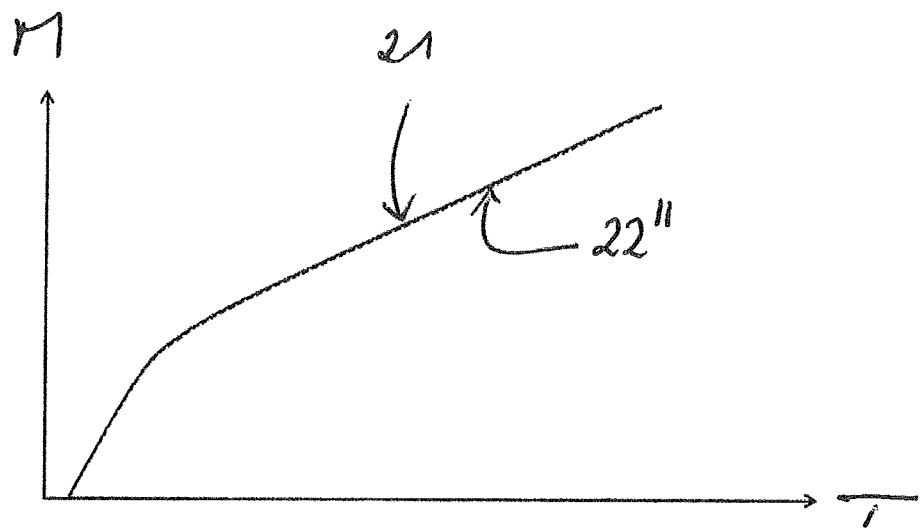
FIG. 6 is a fourth time diagram for illustrating the invention.

In particular when the activation duration T, i.e. the activation start and/or the activation end of the solenoid valve for the respective main fuel injector 6, is compensated for dependent on the drift or wear detected in the standby mode and injection mode, which is reflected by the offset ΔT1 and the offset ΔT2 of FIGS. 3 and 5 between the respective set point profile and the respective actual profile of the structure-borne sound waves, the actual injection mass shown in FIG. 6 by the curve profile 22' is formed during the activation of the solenoid valve of the respective main fuel injector 6, which follows the set point injection mass 21.

Because of this it is then possible, despite a drift or wear on the main fuel injector 6, in particular on the solenoid valve and/or on the nozzle needle and/or on the nozzle seat, to exactly introduce a desired fuel quantity into the cylinder 2. Because of this it is possible in particular with dual-fuel engines 1 to operate the main fuel injectors 6 so accurately that the same can be utilized as ignition fluid injectors even in the second operating mode so that separate ignition fluid injectors can be omitted.

The above details cannot only be employed with dual-fuel engines but also with engines that exclusively combust diesel fuels. In this case, the efficiency can then be increased and exhaust gas emissions reduced.

Furthermore, the above details can be utilised in order to introduce the gas quantity introduced in the region of the gas fuel injectors 14 of a dual-fuel engine into the charge air 10 with greater accuracy. In the region of the gas fuel injectors 14, a sticking of the gas fuel injectors 14 can be monitored. Such a sticking of the gas fuel injectors according to the prior art results in an uncontrolled feeding of gas, as a result of which in the charge air tract and also in the exhaust gas tract of the internal combustion engine the explosion hazard is increased. This can be avoided with the invention since by detecting the structure-borne sound waves and/or accelerations on the gas fuel injectors 14 a sticking of the same can be detected and corresponding countermeasures thus be introduced in order to stop the uncontrolled feeding of gas. In particular, an emergency stop of the internal combustion engine can be triggered in this case. Furthermore, a valve assigned in the gas feed line 15 upstream of the gas fuel injectors 14 which is not shown can be closed in order to interrupt the gas supply in the direction of the gas fuel injectors 14.

The invention, furthermore, relates to a control system, namely an electronic control system for carrying out the method according to the invention, wherein this control system in particular is an engine control system. This control system comprises elements for carrying out the method on the control side, wherein these elements are software and hardware. The hardware includes data interfaces in order to exchange data with assemblies involved in the carrying out of the method according to the invention, in particular with the employed sensors. Furthermore, the hardware includes a processor for data processing and a memory for data storage. The software includes program modules for carrying out the method according to the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an internal combustion engine having multiple cylinders, wherein each cylinder comprises at least one fuel injector 4, comprising:
   activating each fuel injector to open and close a solenoid valve of a respective fuel injector;
   detecting by measurement at least one of structure-borne sound waves emitted by the fuel injectors and accelerations caused by the fuel injectors;
   evaluating the at least one of the structure-borne sound waves detected by measurement and the accelerations detected by measurement are evaluated;
   automatically determining, based on the evaluation, characteristics of the fuel injector;
   and at least one of:
   (1) activating the solenoid valve of the fuel injector, during a stationary state of the internal combustion engine, for opening and closing without fuel injection pressure on the fuel injectors;
      detecting the at least one of the structure-borne sound waves emitted by the fuel injectors and the accelerators caused by the fuel by measurement; and
      dependent on a comparison of the actual measurement quantities with set point quantities, a solenoid valve-dependent drift or wear of the fuel injectors is identified; and
   (2) operating the internal combustion engine in an injection mode during which the solenoid valve of the fuel injector is activated for opening and closing with fuel injection pressure on the fuel injectors;
      detecting the at least one of the sound waves emitted by the fuel injectors and the accelerations caused by the fuel injector by measurement; and
      dependent on a comparison of the actual measurement quantities with at least one of set point quantity one of a nozzle needle-dependent and nozzle seat-dependent drift or wear of the fuel injectors is identified.

2. The method according to claim 1, further comprising:
   comparing the detected at least one of the structure-borne sound waves and the accelerations with at least one of a respective reference value and among themselves,
   wherein based on this comparison characteristics of the fuel injectors are automatically determined.

3. The method according to claim 1, wherein the at least one of the structure-borne sound waves and the accelerations are detected with corresponding structure-borne sound wave sensors and acceleration sensors that are attached to assemblies coupled to the fuel injector in terms of structure-borne sound wave, or are detected with structure-borne sound wave sensors, which are directly attached to the fuel injectors.

4. The method according to claim 2, wherein based on the comparison at least one of an opening duration, an opening speed, a closing speed, an opening time, a closing time, an opening degree, a closing degree, a wear, and a drift of the fuel injectors is automatically determined.

5. The method according to claim 2, wherein based on the comparison, properly operating fuel injectors and fuel injectors that are not operating properly are automatically determined.

6. The method according to claim 1, wherein
   dependent on the solenoid valve-dependent drift or wear at least one of:
   an activation start and an activation end of the respective solenoid valve of the respective fuel injector is adapted, and dependent on the one at least one of the nozzle needle-dependent and
   nozzle seat-dependent drift or wear an activation start an activation end of the respective solenoid valve of the respective fuel injector is adapted.

7. The method according to claim 1, wherein with a diesel engine at least one of structure-borne sound waves emitted by the diesel fuel injectors and accelerations caused by the diesel fuel injectors are detected.

8. The method according to claim 1, wherein with a dual-fuel engine
   in a first operating mode at least one of the structure-borne sound waves emitted by diesel fuel injectors and accelerations caused by diesel fuel injectors are detected and evaluated, and
   in a second operating mode, the at least one of the structure-borne sound waves emitted by diesel fuel injectors and the accelerations caused by the diesel fuel injectors and at least one of structure-borne sound waves emitted by gas fuel injectors and accelerations caused by the gas fuel injectors are detected and evaluated.

9. A control system for operating an internal combustion engine, wherein the control system, on a control side, is configured to:
   activate each fuel injector to open and close a solenoid valve of a respective fuel injector;
   detect by measurement at least one of structure-borne sound waves emitted by the fuel injectors and accelerations caused by the fuel injectors;
   evaluate the at least one of the structure-borne sound waves detected by measurement and the accelerations detected by measurement are evaluated; and
   automatically determine, based on the evaluation, characteristics of the fuel injector;
   automatically determining, based on the evaluation, characteristics of the fuel injector;
   and at least one of:
   (1) activate the solenoid valve of the fuel injector, during a stationary state of the internal combustion engine, for opening and closing without fuel injection pressure on the fuel injectors;
      detect the at least one of the structure-borne sound waves emitted by the fuel injectors and the accelerators caused by the fuel by measurement; and
      dependent on a comparison of the actual measurement quantities with set point quantities, a solenoid valve-dependent drift or wear of the fuel injectors is identified; and
   (2) operate the internal combustion engine in an injection mode during which the solenoid valve of the fuel injector is activated for opening and closing with fuel injection pressure on the fuel injectors;
      detect the at least one of the sound waves emitted by the fuel injectors and the accelerations caused by the fuel injector by measurement; and
      dependent on a comparison of the actual measurement quantities with at least one of set point quantity one of a nozzle needle-dependent and nozzle seat-dependent drift or wear of the fuel injectors is identified.

10. The control system of claim 9, wherein
    dependent on the solenoid valve-dependent drift or wear the control system is configured to adapt at least one of an activation start and an activation end of the respective solenoid valve of the respective fuel injector, and dependent on the one at least one of the nozzle needle-dependent and nozzle seat-dependent drift or wear the control system is configured to adapt at least one of an activation start an activation end of the respective solenoid valve of the respective fuel injector.

11. The control system of claim 9, further configured to compare the detected at least one of the structure-borne sound waves and the accelerations with at least one of a respective reference value and among themselves, wherein based on this comparison characteristics of the fuel injectors are automatically determined.

12. The control system of claim 11, wherein based on the comparison at least one of an opening duration, an opening speed, a closing speed, an opening time, a closing time, an opening degree, a closing degree, a wear, and a drift of the fuel injectors is automatically determined.

13. The control system of claim 11, wherein based on the comparison, properly operating fuel injectors and fuel injectors that are not operating properly are automatically determined.

14. The control system of claim 13, further configured to trigger an emergency stop of the internal combustion engine when it is determined that fuel injectors are not operating properly.

* * * * *